UNITED STATES PATENT OFFICE.

HARRY PAULING, OF BRANDAU, AUSTRIA-HUNGARY.

PROCESS OF MANUFACTURING NITRIC ACID.

No. 807,491.      Specification of Letters Patent.      Patented Dec. 19, 1905.

Application filed April 2, 1902. Serial No. 101,065.

*To all whom it may concern:*

Be it known that I, HARRY PAULING, engineer of mines, a citizen of the Empire of Austria-Hungary, and a resident of Brandau, Austria-Hungary, (whose post-office address is House No. 200,) have invented certain new and useful Improvements in Processes for Manufacturing Nitric Acid, of which the following is a specification.

My present invention relates to a process for manufacturing nitric acid from moist atmospheric air by exposing same to the subsequent influence of electric sparks and nonluminous discharges.

In order to perform my new process, I expose the air in convenient apparatus to the influence of electric-spark discharges, whereby the nitrogen of the air is completely converted into $N_2O_3$, (nitrogen trioxid.) The mixture of gases thus obtained is then mixed with fresh atmospheric air, and then the whole is exposed in another apparatus to the influence of dark electric discharges. The oxygen of the air is thereby converted into ozone, which in forming is combined with the nitrogen trioxyd formed in the first process and thereby forms anhydrous nitric acid:

$$N_2O_3 + 2O_3 = N_2O_5 + 2O_2.$$

Upon adding water the anhydrous nitric acid is converted into $HNO_3$:

$$N_2O_5 + H_2O = 2HNO_3.$$

In order to form nitric acid ($HNO_3$) directly, $$(N_2O_3 + H_2O + 2O_3 = 2HNO_3 + 2O_2,)$$

the air may be charged with moisture before undergoing the electrical treatment. To this end the air may be conducted through a vessel or tube containing water, where it is charged with moisture, and then into the electric apparatus.

Having thus fully described and ascertained the nature of my invention and in what manner the same is to be performed, what I claim is—

The herein-described process, which consists in treating atmospheric air with electric-spark discharges, adding fresh atmospheric air to the air treated, exposing the mixture thus obtained to the action of dark electric discharges, and, adding moisture to the mixture thus obtained.

In testimony whereof I affix my signature in presence of two witnesses.

HARRY PAULING.

Witnesses:
WOLDEMAR HAUPT,
HENRY HASPER.